United States Patent Office 3,506,668
Patented Apr. 14, 1970

3,506,668
METHOD OF PREPARING 8-HYDROXY-QUINOLINES
George Y. Lesher, Schodack, N.Y., assignor to Sterling Drug Inc., New York, N.Y., a corporation of Delaware
No Drawing. Original application Jan. 26, 1965, Ser. No. 428,244, now Patent No. 3,429,887, dated Feb. 25, 1969. Divided and this application Jan. 12, 1968, Ser. No. 697,301
Int. Cl. C07d 33/38
U.S. Cl. 260—289                                          6 Claims

ABSTRACT OF THE DISCLOSURE

1 - (lower-alkyl) - 3-Z-1,4-dihydro-4-oxo-1,7-naphthyridines where Z is carboxy or groups convertible thereto by hydrolysis, having antibacterial properties, are prepared by 1-alkylating corresponding 3-Z-1,4-dihydro-4-hydroxy-1,7-naphthyridines. Other aspects include: 7-alkyl-1,7 - naphthyridinium quaternary salts; a rearrangement conversion of said salts bearing an 8 - alkyl substituent under alkaline conditions to yield 8-hydroxyquinolines; acylation of 8-alkyl-1,7-naphthyridines to form 8-acyloxy (and diacyloxy)methyl - 1,7 - naphthyridines; and, intermediate 4-hydroxy-1,7-naphthyridine-3-carboxylic acid derivatives bearing lower-alkyl substituents at the 8- and/or 6-positions of the 1,7-naphthyridine ring.

This application is a division of my copending application Ser. No. 428,244, filed Jan. 26, 1965, now U.S. 3,429,887, granted Feb. 25, 1969.

This invention relates to a method of preparing 8-hydroxy-quinolines from 8 - (lower-alkyl)-1,7-naphthyridinium salts.

The invention disclosed and claimed in Ser. No. 428,-244, resides in the class of compounds which I designate 1 - (lower-alkyl)-3-Z-1,4-dihydro-4-oxo-1,7-naphthyridines where Z stands for carboxy or a group convertible to carboxy by hydrolysis. Accordingly, I depict these compounds as having lower-alkyl attached to the 1-nitrogen atom of 3 - Z-1,4-dihydro-4-oxo-1,7-naphthyridines where Z is defined as above. The tangible embodiments of this composition aspect of the invention possess the inherent applied use characteristics of having antibacterial properties, as determined by standard bacteriological evaluation procedures. Also, they are useful as intermediates, as shown hereinbelow.

Without limiting the generality of the foregoing, illustrative and preferred embodiments of my 3-Z-1,4-dihydro-4-oxo-1,7-naphthyridines are those of Formula I

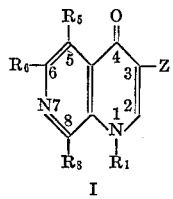

I where Z is carboxy, lower-carbalkoxy, carbamyl or cyano; $R_1$ is lower-alkyl; $R_5$ is hydrogen or lower-alkyl; $R_6$ is hydrogen, lower-alkyl, lower-alkoxy, hydroxy, amino or lower-alkanoylamino; and, $R_8$ is hydrogen, lower-alkyl, lower-alkoxy, hydroxy, amino, lower - alkanoylamino, lower-alkanoyl, hydroxymethyl, lower-alkanoyloxymethyl or di-(lower-alkanoyloxy)methyl. Also encompassed by this aspect of the invention are corresponding 5,6,7,8-tetrahydro derivatives thereof, optionally substituted at the 7-position by lower-alkyl, lower-alkenyl or benzyl as described hereinbelow.

Each of the terms "lower-alkyl," "lower-alkoxy" and "lower-alkanoyl," as used throughout this specification, e.g., as used in the definitions for $R_5$, $R_6$ or $R_8$ in Formula I, means alkyl, alkoxy or alkanoyl radicals having from one to six carbon atoms which can be arranged as straight or branched chains, among which are, for purposes of illustration but without limiting the generality of the foregoing, methyl, ethyl, n-propyl, isopropyl, 2-butyl and n-hexyl for lower-alkyl; by methoxy, ethoxy, n-propoxy, isopropoxy, isobutoxy, n-amoxy and n-hexoxy for lower-alkoxy; and, by formyl, acetyl, propionyl (n-propanoyl), isobutyryl (2-methyl-n-propanoyl) and caproyl (n-hexanoyl) for lower-alkanoyl.

The term "lower-carbalkoxy," as used throughout this specification, e.g., as one of the meanings for Z in Formula I, means carbalkoxy radicals where the alkoxy portion can be straight- or branch-chained and has from one to six carbon atoms, as illustrated by carbomethoxy, carbethoxy, carbo-n-propoxy, carbisopropoxy, carbo-n-butoxy and carbo-n-hexoxy.

The term "lower-alkenyl," as used throughout this specification, means alkenyl radicals having preferably from three to six carbon atoms, as illustrated by 2-propenyl (allyl), 2-methyl-2-propenyl, 2-butenyl, 3-butenyl and 2-hexenyl.

The processes for preparing the compounds of Formula I are disclosed in said application Ser. No. 428,244.

In the process for preparing the 1-(lower-alkyl)-3-Z-1,4-dihydro-4-oxo-1,7-naphthyridines by reacting a 3-Z-4-hydroxy-1,7-naphthyridine with a lower-alkyl ester, e.g., halide, the alkylation occurs at the 1-nitrogen atom; however, I found that a competing quaternization reaction also occurs at the 7-nitrogen atom. For example, reaction of ethyl 4 - hydroxy-8-methyl-1,7-naphthyridine-3-carboxylate when reacted with methyl iodide in dimethylformamide in the presence of anhydrous potassium carbonate yielded a mixture of ethyl 1,4 - dihydro-1,8-dimethyl-4-oxo - 1,7 - naphthyridine-3-carboxylate and 3-carbethoxy-7,8-dimethyl-4-hydroxy-1,7-naphthyridinium iodide. Quaternization at the 7-position is favored by the absence of an acid-acceptor and can be blocked by using the 7-oxide. Also affecting the ratio of 1-alkylation and 7-quaternization are steric factors involving the size of substituents at the 6-position and/or 8-position of the 1,7-naphthyridine ring. As presented hereinbelow, the 7-alkylated-4-hydroxy-1,7-naphthyridinium salts bearing an 8-(lower-alkyl) substituent, as well as their hydroxide inner salts, are useful in the preparation of 4,8-dihydroxyquinolines.

Also disclosed and claimed said application Ser. No. 428,244 are the following: lower-alkyl 6,8-di-(lower-alkyl)-4-hydroxy-1,7-naphthyridine-3-carboxylates; lower-alkyl 8 - (lower-alkyl)-4-hydroxy-1,7-naphthyridine-3-carboxylates; the process of reacting the 7-oxide of an 8-methyl-1,7-naphthyridine or the 7-oxide of an 8-(lower-alkanoyloxymethyl) - 1,7 - naphthyridine with a lower-alkanoic anhydride to prepare, respectively, an 8-(lower-alkanoyloxymethyl)-1,7-naphthyridine or an 8-[di-(lower-alkanoyloxy)methyl] - 1,7 - naphthyridine; and, 3-Z-4-hydroxy-8-$R_8$-1,7-naphthyridine where Z is carboxy or lower-carbalkoxy, and $R_8$ is hydroxymethyl, lower-alkanoyloxymethyl, di-(lower-alkanoyloxy)methyl and formyl.

Also encompassed by my invention disclosed and claimed in said Ser. No. 428,244 are quaternary-ammonium salts of the aforesaid 1-alkyl-3-Z-1,4-dihydro-4-oxo-1,7-naphthyridines, quaternization occurring at the 7-ring-nitrogen. These salts are useful for further identification of the aforesaid compounds and, also, where bearing an 8-(lower-alkyl) substituent, as intermediates for the preparation of 8-hydroxy-4-oxoquinolines described hereinbelow. The quaternary ammonium salts are obtained by the addition of esters having a molecular weight less than about 200 to the free base form of the compounds. A preferred class of esters comprises lower-alkyl, lower-alkenyl or benzyl esters of inorganic acids or organic sulfonic acids of the formula $R_7$-An where $R_7$ is lower-alkyl, lower-alkenyl or benzyl and An is an anion of a strong inorganic acid or an organic sulfonic acid, e.g., chloride, bromide, iodide, sulfate, methanesulfonate, benzenesulfonate, and para-toluenesulfonate. $R_7$ when benzyl can bear any number and kind of inert substituents in the benzene ring, such substituents being illustrated by, but not limited to, lower-alkyl, lower-alkoxy, halo, nitro, lower-alkylamino, lower-alkylmercapto, and the like. $R_7$-An is thus illustrated by, but not limited to, methyl chloride, methyl bromide, methyl iodide, ethyl bromide, propyl chloride, isobutyl bromide, allyl chloride, allyl bromide, methyl sulfate, methyl methanesulfonate, methyl benzenesulfonate, methyl p-toluenesulfonate, benzyl chloride, benzyl bromide, p-chlorobenzyl chloride, p-nitrobenzyl chloride, o-chlorobenzyl chloride, 3,4-dichlorobenzyl chloride, p-methoxybenzyl chloride, and the like. The quaternary ammonium salts are prepared by mixing the free base and the alkyl, alkenyl or benzyl esters in an organic solvent inert under the conditions of reaction, for example, ethanol, methanol, ether, acetonitrile, dimethylformamide, dimethyl sulfoxide, and the like or, alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

Another composition aspect of the invention disclosed and claimed in said application Ser. No. 428,244 resides in the class of compounds which I designate 8-(lower-alkyl)-7-$R_7$-1,7-naphthyridinium salts, where $R_7$ is lower-alkyl or lower-alkenyl, and where the salts include both those with an external anion, An (defined hereinabove), whose nature is not critical or a part of the invention, and internal or inner salts, wherein a 4-O$^-$ or 3-COO$^-$ group provides the anion. These compounds are useful as intermediates in my hereinbelow-described novel process for preparing 8-hydroxyquinolines. Without limiting the generality of the foregoing, illustrative and preferred embodiments of said quaternary ammonium salts are 7,8-di-(lower-alkyl)-1,7-naphthyridinium salts, in particular, 3 - carboxy-7,8-di-(lower-alkyl)-4-hydroxy-1,7-naphthyridinium salts and 3-carboxy-1,4-dihydro-7,8-di-(lower-alkyl)-4-oxo-1,7-naphthyridinium salts. Preferred hydroxide inner salt derivatives are 4-hydroxy-7-(lower-alkyl)-1,7-naphthyridinium hydroxide inner salts and 3-carboxy-1,4 - dihydro - 1,7 - di-(lower-alkyl)-4-oxo-1,7-naphthyridinium hydroxide inner salts, illustrative and preferred embodiments of which are those of the probable respective Formulas II and III:

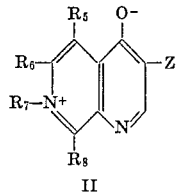 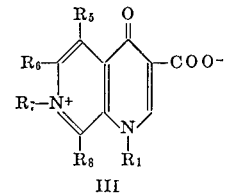

II    III where Z (in Formula II) is hydrogen, carboxy or cyano; $R_5$ (in Formula II) is hydrogen, hydroxy or lower-alkyl and $R_5$ (in Formula III) is hydrogen or lower-alkyl; R (in each of Formulas II and III) is hydrogen or lower-alkyl; and $R_1$ (in Formula III), and $R_7$ and $R_8$ (in each of Formulas II and III) are each lower-alkyl.

The inner salts are prepared, as described hereinbelow in the specific exemplary disclosure, by reacting the corresponding 8-(lower-alkyl)-7-$R_7$-1,7-naphthyridinium salts, e.g., halides, with an acid-acceptor, preferably with an aqueous solution of an acid-acceptor, e.g. sodium hydroxide, potassium hydroxide, ammonia, potassium bicarbonate, at room temperature or, if necessary, with warming for a short period.

The process of my invention sought to be patented is described as residing in the process of preparing an 8-hydroxyquinoline by heating an 8-(lower-alkyl)-7-$R_7$-1,7-naphthyridinium salt, above defined, in an aqueous alkaline medium. Without limiting the generality of the foregoing, illustrative and preferred embodiments are: the preparation of an 8-hydroxyquinoline from a 7,8-di(lower-alkyl)-1,7-naphthyridinium salt, in particular, a 4,8-dihydroxyquinoline from a 4-hydroxy-7,8-di-(lower-alkyl)-1,7-naphthyridinium salt or a 1,4-dihydro-8-hydroxy-1-(lower-alkyl)-4-oxoquinoline-3-carboxylic acid from a 3 - carboxy-1,4-dihydro-4-oxo-1,7,8-tri-(lower-alkyl)-1,7-naphthyridinium salt; the preparation of a 4,8-dihydroxyquinoline from a 4 - hydroxy-7,8-di-(lower-alkyl)-1,7-naphthyridinium hydroxide inner salt; and, the preparation of a 1,4-dihydro-8-hydroxy-1-(lower-alkyl)-4-oxoquinoline-3-carboxylic acid from a 3-carboxy-1,4-dihydro-4-oxo-1,7,8-tri-(lower-alkyl) - 1,7 - naphthyridinium hydroxide inner salt. These conversions to 8-hydroxyquinolines are further illustrated by the following conversions of: 7,8-dimethyl-1,7-naphthyridinium iodide to 8-hydroxyquinoline, 4 - hydroxy-7,8-dimethyl-1,7-naphthyridinium iodide or hydroxide inner salt to 4,8-dihydroxyquinoline, 3-carboxy - 4 - hydroxy-6,7,8-trimethyl-1,7-naphthyridinium iodide or hydroxide inner salt to 4,8-dihydroxy-6-methylquinoline-3-carboxylic acid, 3 - carboxy-8-ethyl-4-hydroxy-6,7-dimethyl-1,7-naphthyridinium iodide or hydroxide inner salt to 4,8-dihydroxy-6,7-dimethylquinoline-3-carboxylic acid, and 3-carboxy-1,4-dihydro-4-oxo-1,6,7,8-tetramethyl-1,7-naphthyridinium iodide or hydroxide inner salt to 1,4 - dihydro-1,6-dimethyl-8-hydroxy-4-oxoquinoline-3-carboxylic acid. In each instance, the other product of the conversion is $R_7$-$NH_2$, i.e., a lower-alkylamine or a lower-alkenylamine, e.g., methylamine when $R_7$ is methyl or allylamine when $R_7$ is allyl. These conversions are carried out preferably by heating the 1,7-naphthyridinium salt in an aqueous alkaline medium, preferably in an aqueous solution of potassium or sodium hydroxide. The reaction is conveniently carried out by heating the alkaline reaction mixture on a steam bath or under gentle reflux for a period of time sufficient to complete the conversion. Quaternary ammonium salts of the 3-Z-4-OH type or 1-$R_1$-3-carboxy-4-oxo type are probably first converted, as noted above, to corresponding hydroxide inner salts of the probable respective Formulas II and III. It is noted that in the above reaction when the intermediate salt bears an 8-methyl substituent the resulting 8-hydroxyquinoline is unsubstituted at its 7-position; however, when the intermediate salt bears lower-alkyl other than methyl at the 8-position, the resulting 8-hydroxyquinoline has a 7-alkyl group which has one less carbon atom than the 8-alkyl group of the intermediate salt. Thus, an 8-ethyl-1,7-naphthyridinium salt yields an 8-hydroxy-7-methylquinoline, and 8-n-propyl-1,7-naphthyridinium salt yields an 8-hydroxy-7-ethylquinoline, etc. Optionally, the 8-(lower-alkyl) substituent of the 1,7-naphthyridinium salt can bear a phenyl substituent; thus, an 8-benzyl- or 8-(2-phenylethyl)-1,7-naphthyridinium salt yields, respectively, an 8-hydroxy-7-phenylquinoline or a 7-benzyl-8-hydroxyquinoline.

The following examples will further illustrate the invention without, however, limiting it thereto.

EXAMPLE 1

Ethyl 1,4-dihydro - 4 - oxo-1,6,8-trimethyl-1,7-naphthyridine-3-carboxylate was prepared as follows: A mixture containing 148 g. of ethyl 6,8-dimethyl-4-hydroxy-1,7-naphthyridine-3-carboxylate and 207 g. of anhydrous potassium carbonate in 3 liters of dimethylformamide was stirred on a steam bath until the naphthyridine dissolved (about 30 minutes). To this mixture was added 100 cc. of methyl iodide and the resulting mixture was heated, with stirring, for two hours on a steam bath. The hot reaction mixture was filtered and the filtrate chilled. The crystalline product was washed successively with a small amount of cold dimethylformamide, water and acetone. There was thus obtained 64 g. (41%) of the product, ethyl 1,4-dihydro-4 - oxo - 1,6,8-trimethyl-1,7-naphthyridine-3-carboxylate, M.P. 222–225° C., which was used in Example 2 to prepare the corresponding 3-carboxylic acid. A sample was recrystallized several times from ethanol using decolorizing charcoal to yield the compound as yellow needles, M.P. 224.0–228.6° C. (corr.).

The intermediate ethyl 6,8 - dimethyl-4-hydroxy-1,7-naphthyridine-3-carboxylate was prepared as follows: To a stirred refluxing solution of 3100 cc. of diethyl phthalate was added over a period of about four minutes 312 g. of diethyl N-(2,6 - dimethyl-3-pyridyl)aminomethylenemalonate. The reaction temperature dropped to about 277° C. Heating was continued for about four minutes as the temperature rose to 282° C. The source of heat was removed and ethanol was added to the hot reaction mixture with continued stirring as fast as its distillation would allow (900 cc. were added in seven minutes). The reaction mixture was allowed to cool to room temperature with stirring. The precipitate was collected, washed well with acetone, and dried in air to yield 159 g. (60%) of the product, ethyl 6,8-dimethyl-4-hydroxy-1,7-naphthyridine-3-carboxylate, M.P. 288–291° C. with decomposition.

Following the procedure described above for the preparation of ethyl 6,8-dimethyl-4-hydroxy-1,7-naphthyridine-3-carboxylate using corresponding molar equivalent quantities of the appropriate diethyl N-(substituted-3-pyridyl)aminomethylenemalonate or N-oxide, the ethyl 4-hydroxy-1,7-naphthyridine-3-carboxylates of Table A were prepared:

TABLE A

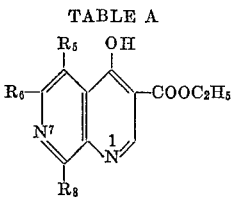

| No. | R₅ | R₆ | R₈ | M.P., ° C. (corr.) |
|---|---|---|---|---|
| 1 | H | C₂H₅ | CH₃ | 265.0–266.0 (dec.). |
| 2 | H | C₂H₅ | C₂H₅ | 237.0–238.2. |
| 3 | H | CH₃CONH | CH₃ | >300.0. |
| 4 | H | CH₃CONH | CH₃CONH | 243.2–246.0 (dec.). |
| 5 | H | H | CH₃ | 278.0–278.8 (dec.). |
| 6 | H | H | OCH₃ | 253.6–255.6 |
| 7ᵃ | H | CH₃ | H | 290.5–291.0 (dec.). |
| 8 | CH₃ | CH₃ | CH₃ | 232–235 (dec., uncorr.). |

ᵃ 7-oxide.

Diethyl N - (2,6-dimethyl-3-pyridyl)aminomethylenemalonate was prepared as follows: A mixture of 77 g. of 3-amino-2,6-dimethylpyridine and 136 g. of diethyl ethoxymethylenemalonate was heated on a steam bath under reduced pressure (15 mm.) for one hour. The resulting solid was collected and recrystallized from n-heptane using decolorizing charcoal to yield 161 g. (87%) of the product, diethyl N-(2,6-dimethyl-3-pyridyl)aminomethylenemalonate, M.P. 102–103° C. A sample recrystallized from ethanol melted at 104–105.4° C. (corr.).

Following the procedure described above for the preparation of diethyl N-(2,6-dimethyl-3-pyridyl)aminomethylenemalonate using corresponding molar equivalent quantities of the appropriate 3-aminopyridine, the N-(3-pyridyl)aminomethylene malonates of Table B were prepared:

TABLE B

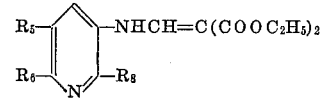

| No. | R₅ | R₆ | R₈ | M.P., ° C. (corr.) |
|---|---|---|---|---|
| 1 | H | C₂H₅ | CH₃ | 85.8–86.2. |
| 2 | H | C₂H₅ | C₂H₅ | 81.0–83.6. |
| 3 | H | CH₃CONH | CH₃ | 151.6–152.8. |
| 4 | H | CH₃CONH | CH₃CONH | 217.0–218.0. |
| 5 | H | CH₃ | H | 83.6–87.6. |
| 6 | H | H | CH₃ | 100.0–100.8. |
| 7 | H | H | OCH₃ | 81–83 (uncorr.). |
| 8 | CH₃ | CH₃ | CH₃ | 108–109 (uncorr.). |

All of the 3-aminopyridines used in the preparation of the compounds of Table B above are known and/or are commercially available except 6-acetamido-3-amino-2-methylpyridine which was prepared in two steps from 6-amino-2-methyl-3-nitropyridine as follows: A 15.3 g. portion of 6-amino-2-methyl-3-nitropyridine was suspended in 10 cc. of pyridine and 100 cc. of acetone, and the resulting mixture was cooled, with stirring, to 5° C. in an ice bath. To this stirred mixture was added over a period of about five minutes 7.9 g. of acetyl chloride. The mixture was stirred while in the ice bath for an additional hour, then at room temperature for thirty minutes and, finally, refluxed on a steam bath for fifteen minutes. The pasty reaction mixture was poured into a mixture of ice and water (250 cc.), stirred, and the resulting solid was collected. After two recrystallizations of the solid, once from ethanol and once from acetonitrile, failed to yield a pure product, it was dissolved in ether containing a little methylene chloride and placed in a chromatographic column containing 350 g. of silica gel and ether-n-pentane (50:50) as the liquid phase. The column was then eluted with ether-pentane (50:50). Evaporation of the elutes yielded a 5.3 g. fraction, a solid, which was recrystallized from ethanol to yield 5.0 g. of 6-acetamido-2-methyl-3-nitropyridine, M.P. 157.2–158.8° C. (corr.).

6-acetamido-2-methyl-3-nitropyridine was also prepared from the corresponding 6-amino compound using acetic anhydride as the acylating agent as follows: To 56.5 g. of 6-amino-2-methyl-3-nitropyridine suspended in 250 cc. of acetic anhydride was added ten drops of concentrated sulfuric acid. The resulting reaction mixture was heated on a steam bath with stirring for two hours and then allowed to stand overnight. The resulting precipitate was collected, washed with water, and air-dried to yield 50.2 g. of 6-acetamido-2-methyl-3-nitropyridine, M.P. 159–160° C.

A 19.5 g. portion of 6-acetamido-2-methyl-3-nitropyridine was hydrogenated in a Parr bottle at room temperature using 300 cc. of absolute ethanol and 2.0 g. of palladium-on-charcoal (10%). The reduction was carried out in about thirty minutes, using an initial pressure of 51 lbs. p.s.i. of hydrogen and a final pressure of 24.9 lbs.

p.s.i. The reaction mixture was filtered through infusorial earth (Super-Cel®) in a sintered glass funnel and the residue was rinsed with ethanol. The combined filtrates were evaporated on a steam bath at room temperature to yield a syrupy residue, which crystallized on standing. This crystalline product, 6-acetamido-3-amino-2-methylpyridine, M.P. 126–128° C., was used directly in the reaction with diethyl ethoxymethylenemalonate to yield Compound No. 3 of Table B above. A sample of the 6-acetamido-3-amino-2-methylpyridine was recrystallized from ethyl acetate using decolorizing charcoal and found to melt at 128.0–129.6° C. (corr.).

3-amino-6-ethyl-2-methylpyridine, 3 - amino-2,5,6-trimethylpyridine and 3-amino-2,6-diethylpyridine were obtained from Reilly Tar and Chemical Corporation.

Following the procedure described above for the preparation of ethyl 1,4 - dihydro - 4 - oxo - 1,6,8 - trimethyl - 1,7-naphthyridine-3-carboxylate using a corresponding molar equivalent quantity of 6,8-dimethyl-4-hydroxy-1,7-naphthyridine-3-carboxamide in place of ethyl 6,8-dimethyl - 4 - hydroxy - 1,7 - naphthyridine - 3 - carboxylate, there can be obtained 1,4-dihydro-4-oxo-1,6,8-trimethyl - 1,7 - naphthyridine - 3 - carboxamide. Alternatively, this 3-carboxamide can be obtained from the corresponding 3-carboxylic acid by reaction of its acid chloride with ammonia, as given in the following paragraph.

1,4 - dihydro - 4 - oxo - 1,6,8 - trimethyl - 1,7 - naphthyridine - 3 - carboxamide.—A mixture containing 23.2 g. of 1,4-dihydro-4-oxo-1,6,8-trimethyl-1,7-naphthyridine-3-carboxylic acid, 20 g. of phosphorus oxychloride and 500 cc. of chloroform was refluxed with stirring on a steam bath for three hours. To the reaction mixture containing the acid chloride of the above acid was poured with stirring 100 cc. of ammonium hydroxide, followed by addition of ice to cool the mixture. The chloroform layer was separated, dried over anhydrous potassium carbonate, and evaporated in vacuo on a steam bath to remove the chloroform. The resulting solid was recrystallized from about 90 cc. of dimethylformamide to yield 1.5 g. of 1,4-dihydro-4-oxo-1,6,8-trimethyl-1,7-naphthyridine-3-carboxamide, M.P. 320–325° C. with decomposition. For analysis, a portion was recrystallized again from dimethylformamide, washed with ethanol, dried and found to melt at 325–330° C. with decomposition.

Analysis.—Calcd. for $C_{12}H_{13}N_3O_2$ (percent): C, 62.32; H, 5.67; N, 18.17. Found (percent): C, 62.30; H, 5.71; N, 17.93.

EXAMPLE 2

1,4 - dihydro - 4 - oxo - 1,6,8 - trimethyl - 1,7 - naphthyridine-3-carboxylic acid was prepared from the corresponding ethyl ester as follows: A mixture containing 64 g. of ethyl 1,4 - dihydro - 4 - oxo - 1,6,8 - trimethyl - 1,7-naphthyridine-3-carboxylate and 500 cc. of 5% aqueous potassium hydroxide solution was heated on a steam bath for two hours. The hot reaction mixture was treated with decolorizing charcoal and filtered. The filtrate was neutralized with 6 N hydrochloric acid. The precipitate that separated was collected and recrystallized from dimethylformamide to yield 47 g. (82%) of the product, 1,4 - dihydro - 4 - oxo - 1,6,8 - trimethyl - 1,7 - naphthyridine-3-carboxylic acid, M.P. 263–265° C. [261.2–263.8° C. (corr.) with decomposition].

Alternatively, 1,4 - dihydro - 4 - oxo - 1,6,8 - trimethyl 1,7-naphthyridine-3-carboxylic acid can be prepared following the procedure described in Example 1 using corresponding molar equivalent quantities of 6,8-dimethyl - 4 - hydroxy - 1,7 - naphthyridine - 3 - carboxylic acid and methyl iodide. The intermediate 6,8-dimethyl - 4 - hydroxy - 1,7 - naphthyridine - 3 - carboxylic acid was prepared by hydrolysis of its corresponding ethyl ester as follows: A mixture containing 54 g. of ethyl 6,8-dimethyl-4-hydroxy-1,7-naphthyridine-3-carboxylate and 340 cc. of 10% aqueous potassium hydroxide solution was heated on a steam bath for ninety minutes. The reaction mixture was acidified with hydrochloric acid and the resulting precipitate was collected, washed successively with water and ethanol, and recrystallized twice from ethanol to yield 6.1 g. of the product, 6,8 - dimethyl - 4 - hydroxy - 1,7 - naphthyridine - 3 - carboxylic acid, M.P. 284.0–284.2° C. (corr.), with decomposition.

1,4 - dihydro - 4 - oxo - 1,6,8 - trimethyl - 1,7 - naphthyridine-3-carboxylic acid can be prepared as its 7-oxide in several steps as follows: oxidizing ethyl 6,8-dimethyl-4 - hydroxy - 1,7 - naphthyridine - 3 - carboxylate by reaction with peracetic acid in acetic acid or with 3-chloroperbenzoic acid in chloroform; reacting the resulting 3 - carbethoxy - 6,8 - dimethyl - 4 - hydroxy - 1,7 - naphthyridine-7-oxide, M.P. 270.0–270.6° C. (corr.) with decomposition, with methyl iodide to obtain 3-carbethoxy - 1,4 - dihydro - 4 - oxo - 1,6,8 - trimethyl - 1,7-naphthyridine-7-oxide, M.P. 223.0–225.0° C. (corr.); and, hydrolyzing the latter by reaction with aqueous potassium hydroxide solution to form 3-carboxy-1,4-dihydro - 4 - oxo - 1,6,8 - trimethyl - 1,7 - naphthyridine - 7-oxide.

EXAMPLE 3

Ethyl 1,4 - dihydro - 6 - ethyl - 1,8 - dimethyl - 4 - oxo-1,7-naphthyridine-3-carboxylate, M.P. 241.8–242.2° C. (corr.), was prepared (56.5% yield) following the procedure described in Example 1 using 14.3 g. of ethyl 6 - ethyl - 4 - hydroxy - 8 - methyl - 1,7 - naphthyridine - 3-carboxylate, 11.0 g. of anhydrous potassium carbonate, 5.0 cc. of methyl iodide and 130 cc. of dimethylformamide.

EXAMPLE 4

1,4 - dihydro - 6 - ethyl - 1,8 - dimethyl - 4 - oxo - 1,7 - naphthyridine-3-carboxylic acid, M.P. 245.0–246.8° C. (corr.), was prepared (98% yield) following the procedure described in Example 2 using 10.2 g. of ethyl 1,4 - dilhydro - 6 - ethyl - 1,8 - dimethyl - 4 - oxo - 1,7 - naphthyridine-3-carboxylate, 25 cc. of 10% aqueous potassium hydroxide solution and 100 cc. of water.

EXAMPLE 5

Following the procedure described in Example 1 using 9.3 g. of ethyl 6-ethyl-8-methyl-4-hydroxy-1,7-naphthyridine-3-carboxylate, 7.5 g. of anhydrous potassium carbonate, 6.0 cc. of ethyl iodide and 85 cc. of dimethylformamide, there was prepared 0.9 g. of ethyl 1,4-dihydro-1,6-diethyl - 8 - methyl - 4 - oxo - 1,7 - naphthyridine - 3 - carboxylate, M.P. 156.8–158.8° C. (corr.).

The above ester was hydrolyzed to yield the corresponding acid, as follows: A small portion of the ester was heated on a steam bath with 10% aqueous potassium hydroxide solution for thirty minutes. The reaction mixture was acidified to a pH of 3.5 using hydrochloric acid. The resulting precipitate was collected, washed with water and dried in a vacuum oven at 60° C. to yield the acid, 1,4 - dihydro - 1,6 - diethyl - 8 - methyl - 4 - oxo - 1,7-naphthyridine-3-carboxylic acid, M.P. 156.8–158.8° C. (corr.).

EXAMPLE 6

Following the procedure described in Example 1 using 7.2 g. of ethyl 6,8-diethyl-4-hydroxy-1,7-naphthyridine-3-carboxylate, 18.0 g. of anhydrous potassium carbonate, 20.1 cc. of ethyl iodide and 70 cc. of dimethylformamide, ether was obtained 2.0 g. of ethyl 1,4-dihydro-1,6,8-triethyl-4-oxo-1,7-naphthyridine-3-carboxylate, M.P. 127.6–129.0° C. (corr.).

The above ester was hydrolyzed to yield the corresponding acid, as follows: A small portion of the ester was heated on a steam bath with 10% aqueous potassium hydroxide solution for fifteen minutes. The reaction mixture was acidified to a pH of 3.5 using hydrochloric acid. The resulting precipitate was collected, washed with water and recrystallized from acetone to yield the acid, 1,4-dihydro - 1,6,8 - triethyl - 4 - oxo - 1,7 - naphthyridine - 3-carboxylic acid, M.P. 151–153° C.

EXAMPLE 7

Following the procedure described in Example 1 using 117 g. of ethyl 6-acetamido-4-hydroxy-8-methyl-1,7-naphthyridine-3-carboxylate, 224 g. of anhydrous potassium carbonate, 173 g. of methyl iodide and 1170 cc. of dimethylformamide, there was obtained 76.1 g. of ethyl 6-acetamido - 1,4 - dihydro - 1,8 - dimethyl - 4 - oxo - 1,7-naphthyridine-3-carboxylate, M.P. 314–316° C. with decomposition. Recrystallization of a 15 g. portion from dimethylformamide, using decolorizing charcoal, yielded 11.5 g. of the ester, M.P. 335–336° C. with decomposition.

EXAMPLE 8

6 - amino - 1,4 - dihydro - 1,8 - dimethyl - 4 - oxo - 1,7-naphthyridine-3-carboxylic acid was prepared as follows: A mixture containing 7.6 g. of ethyl 6-acetamido-1,4-dihydro - 1,8 - dimethyl - 4 - oxo - 1,7 - naphthyridine - 3-carboxylate, 35 cc. of 10% aqueous potassium hydroxide solution and 100 cc. of water was refluxed with stirring for about ninety minutes and then filtered through a sintered glass funnel. The hot filtrate was acidified with concentrated hydrochloric acid; the resulting precipitate was collected, washed with a little water, and recrystallized from dimethylformamide using decolorizing charcoal to yield 1.4 g. of the product, 6-amino-1,4-dihydro-1,8-dimethyl-4-oxo-1,7-naphthyridine-3-carboxylic acid, M.P. >300.0° C.

EXAMPLE 9

(A) 1,4 - dihydro - 1,8 - dimethyl - 6 - hydroxy - 4 - oxo-1,7-naphthyridine-3-carboxylic acid was prepared from the corresponding 6-amino compound as follows: To a suspension of 16.9 g. of 6-amino-1,4-dihydro-1,8-dimethyl-4-oxo-1,7-naphthyridine-3-carboxylic acid and 112 cc. of water chilled in an ice bath was added dropwise with stirring over a period of about twenty minutes 85 cc. of sulfuric acid. The temperature of the reaction mixture ranged between 20 and 30° C. The resulting solution was cooled to 0° C. and a solution containing 10.0 g. of sodium nitrite in 16 cc. of water was added dropwise over a period of seventy-two minutes, with the dropping tube extended below the surface of the reaction solution. The temperature of the reaction mixture was maintained between −3° to 2° C. using a salt-ice bath. The clear yellow solution was stirred for an additional twenty minutes and then poured into 350 cc. of hot water (95° C.). The reaction mixture was heated on a steam bath for thirty-five minutes and then allowed to stand overnight. It was then cooled in an ice bath and the solid that separated was collected and dissolved in dilute potassium hydroxide solution. The solution was treated with decolorizing charcoal, filtered, and the filtrate was acidified to a pH of 5.5 using acetic acid. The yellow solid that separated was collected, washed well with water, recrystallized from dimethylformamide using decolorizing charcoal, washed with acetone and dried in a vacuum oven (about 70° C.) to yield 6.8 g. (40%) of the product, 1,8-dimethyl-6-hydroxy-4-oxo-1,7-naphthyridine-3-carboxylic acid, M.P. >300.0° C. (corr.).

1,4 - dihydro - 1,8 - dimethyl - 6 - hydroxy - 4 - oxo-1,7-naphthyridine-3-carboxylic acid when tested by standard in vitro bacteriological procedures was found to have bacteriostatic activity against *Clostridium welchii* at a concentration of 0.75 mg./cc.

(B) Methyl 1,4-dihydro-1,8-dimethyl-6-methoxy-4-oxo-1,7-naphthyridine-3-carboxylate is obtained by heating on a steam bath for six hours with stirring 1,4-dihydro-1,8-dimethyl - 6 - hydroxy - 4 - oxo - 1,7 - naphthyridine - 3-carboxylic acid in dimethylformamide with an excess (more than two-fold) of methyl iodide and anhydrous potassium carbonate. The product is isolated by pouring the reaction mixture into water, cooling the mixture, and collecting the product by filtration.

EXAMPLE 10

3 - carboxy-1,4-dihydro-1-methyl-4-oxo-1,7-naphthyridine-7-oxide was prepared as follows: A 14.4 g. portion of 3-carboxy-4-hydroxy-1,7-naphthyridine-7-oxide was dissolved in 102 cc. of 10% aqueous potassium hydroxide solution with heating. To this solution was added 350 cc. of ethanol and 50 cc. of water, and the resulting mixture was heated on a steam bath and filtered to remove a small quantity (less than 1 g.) of a precipitate. The filtrate was refluxed and to it was added methyl iodide in 5 cc. portions of about five-minute intervals over a period of fifty minutes. The pH was adjusted to 8.5 using 10% aqueous potassium hydroxide solution; the mixture was cooled to about 20° C.; the solid was collected, washed with 30 cc. of 2 to 1 ethanol-water and then with ethanol, and dried at 70° C. in a vacuum oven to yield 12.6 g. (70%) of the potassium salt of 3-carboxy-1,4-dihydro-1-methyl-4-oxo-1,7-naphthyridine-7-oxide, M.P. 357° C. with decomposition. A 7.6 g. portion of the potassium salt was dissolved in 150 cc. of water and the solution was filtered. The filtrate was acidified by dropwise addition of 6 N hydrochloric acid to a pH of 5. The solid was collected, triturated successively with warm water and ethanol, dried at 100° C. in a vacuum oven, and then recrystallized from dimethylformamide to yield 3.5 g. of 3-carboxy-1,4-dihydro-1-methyl-4-oxo-1,7-naphthyridine-7-oxide, M.P. >300° C. with decomposition, after triturating with ethanol and drying in a vacuum oven at 80° C.

The intermediate 3-carboxy-4-hydroxy-1,7-naphthyridine-17-oxide was prepared by hydrolysis of the corresponding ethyl ester as follows: A mixture containing 54.2 g. of 3-carbethoxy-4-hydroxy-1,7-naphthyridine-7-oxide and 360 cc. of 10% aqueous potassium hydroxide solution was heated on a steam bath for one hour. The reaction solution was then acidified to a pH of 6 and filtered. The filtrate was made acidic to Congo red and the separated precipitate was collected and recrystallized from water, using decolorizing charcoal, to yield 35.7 g. (75%) of the product, 3-carboxy-4-hydroxy-1,7-naphthyridine-7-oxide. A small sample for analysis was recrystallized a second time from water and found to have no change in the melting point, M.P. 298.2—299.0° C. (corr.) with decomposition.

EXAMPLE 11

Ethyl 1,4-dihydro-6,8-diethyl-1-methyl-4-oxo-1,7-naphthyridine-3-carboxylate was prepared as follows: A mixture containing 13.7 g. of ethyl 6,8-diethyl-4-hydroxy-1,7-naphthyridine-3-carboxylate, 11.0 g. of anhydrous potassium carbonate and 100 cc. of dimethylformamide was heated on a steam bath with stirring for about fifteen minutes. To the stirred mixture was added 4 cc. of methyl iodide and heating was continued on the steam bath for three and one-half hours with subsequent additions of 4 cc. portions of methyl iodide at the end of each of the first and second hours. The reaction mixture was filtered to remove the solid and the filtrate was concentrated to dryness. The residue was triturated with 100 cc. of ethanol and the undissolved material was filtered off. The ethanol solution was concentrated to dryness, the residue taken up with 100 cc. of chloroform, the chloroform solution washed twice with water and concentrated in vacuo to dryness. The residue was dissolved in benzene, the benzene solution washed twice with water, concentrated to near dryness and treated with n-hexane whereupon a solid separated. The solid was collected and dried to yield 11.0 g. (76.5%) of the product, ethyl 1,4-dihydro-6,8 - diethyl - 1 - methyl - 4 - oxo - 1,7 - naphthyridine-3-carboxylate, M.P. 150–154° C. Two recrystallizations of the product from benzene yielded a sample melting at 154–157° C.

EXAMPLE 12

1,4 - dihydro-6,8-diethyl-1-methyl-4-oxo-1,7-naphthyridine-3-carboxylic acid was prepared as follows: A mixture containing 11.5 g. of ethyl 1,4-dihydro-6,8-diethyl-1-methyl-4-oxo-1,7-naphthyridine-3-carboxylate, 32 cc. of 10% potassium hydroxide solution and about 50 cc. of ethanol was heated on a steam bath for about forty-five minutes, allowing the ethanol to evaporate from the reaction mixture. The mixture was diluted with about 500 cc. of water, the mixture filtered, and the filtrate neutralized with 6 N hydrochloric acid. The resulting solid was collected, washed with water and dried to yield 8.2 g. (83%) of the product, M.P. 185–187° C. The above 8.2 g. portion of the product was combined with a 6.1 g. portion from another preparation and recrystallized from about 600 cc. of ethanol, dried at 80° C. in a vacuum oven for four hours to yield 13.0 g. of the product, M.P. 185.6–187.2° C. (corr.).

EXAMPLE 13

Ethyl 1,4 - dihydro-1,8-dimethyl-4-oxo-1,7-naphthyridine-3-carboxylate, M.P. 180.2–181.2° C. (corr.), was obtained following the procedure described in Example 1 using corresponding molar equivalent quantities of ethyl 4-hydroxy-8-methyl-1,7-naphthyridine-3-carboxylate, anhydrous potassium carbonate and methyl iodide.

1,4 - dihydro-1,8-dimethyl-4-oxo-1,7-naphthyridine-3-carboxylic acid is obtained by hydrolyzing the above ester following the procedure described in Example 2 using corresponding molar equivalent quantities of the reactants.

EXAMPLE 14

3 - carboxy - 1,4-dihydro-1,6-dimethyl-4-oxo-1,7-naphthyridine-7-oxide is obtained following the procedure described in Example 10 using corresponding molar equivalent quantities of 3-carboxy-4-hydroxy-6-methyl-1,7-naphthyridine-7-oxide, potassium hydroxide and methyl iodide. The intermediate 3-carboxy-4-hydroxy-6-methyl-1,7-naphthyridine-7-oxide is obtained by hydrolyzing its ethyl ester following the procedure described in Example 10.

1,4 - dihydro - 1,6-dimethyl-4-oxo-1,7-naphthyridine-3-carboxylic acid is obtained by catalytic hydrogenation of the above-corresponding 7-oxide using corresponding molar equivalent quantities of the reactants.

The intermediate 3-carbethoxy-4-hydroxy-6-methyl-1,7-naphthyridine-7-oxide is obtained in two steps as follows: To a stirred solution containing 11.0 g. of diethyl N-(6-methyl-3-pyridyl)aminomethylenemalonate and 10 cc. of acetic acid warmed to 55° C. was added portionwise over a period of thirty minutes 7.3 cc. of 40% peracetic acid. The reaction mixture was stirred for an additional ninety minutes at about 60° C. and then allowed to stand overnight. The reaction mixture was evaporated to dryness and the resulting syrupy residue was dissolved in 50 cc. of isopropyl alcohol. A small portion of the alcohol solution was evaporated to remove the alcohol and the residue was triturated with n-pentane until crystallization occurred. The isopropyl alcohol solution was seeded with the crystals whereupon a crystalline precipitate separated. The mixture was chilled well and the precipitate collected. The precipitate was triturated with hot isopropyl ether and filtered to yield 1.4 g. of a pale yellow powder, M.P. 132–134° C. This material was dissolved in hot benzene, the solution filtered, and n-pentane added to the hot filtrate to the point of turbidity. The solution was cooled and the pale yellow precipitate was collected and air-dried to yield the 1-oxide of diethyl N-(6-methyl-3-pyridyl)aminomethylenemalonate, M.P. 134–136° C. This compound is cyclized following the procedure described in Example 1 to yield 3-carbethoxy - 4 - hydroxy - 6-methyl-1,7-naphthyridine-7-oxide.

The compounds of Table C were prepared following the indicated above described procedures using corresponding molar equivalent quantities of the appropriate reactants.

TABLE C

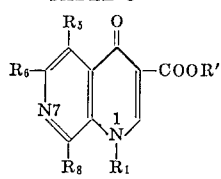

| Prep'n. Like Ex. | R' | R₁ | R₅ | R₆ | R₈ | M.P., ° C. (corr.) |
|---|---|---|---|---|---|---|
| 1 | C₂H₅ | CH₃ | CH₃ | CH₃ | CH₃ | (ᵃ). |
| 2 | H | CH₃ | CH₃ | CH₃ | CH₃ | 242.0–243.8. |
| 1ᵇ | C₂H₅ | CH₃ | H | CH₃ | H | (ᵃ). |
| 2ᵇ | H | CH₃ | H | CH₃ | H | >300. |
| 1ᵇ | C₂H₅ | C₂H₅ | H | CH₃ | H | (ᵃ). |
| 2ᵇ | H | C₂H₅ | H | CH₃ | H | >300. |
| 13 | H | CH₃ | H | CH₃ | H | >300. |
| 13 | H | C₂H₅ | H | CH₃ | H | 283.0–283.8 (dec.). |
| 1ᵇ | C₂H₅ | C₃H₇-n | H | CH₃ | H | (ᵃ). |
| 2ᵇ | H | C₃H₇-n | H | CH₃ | H | 291–293 ᶜ (dec.). |
| 13 | H | C₃H₇-n | H | CH₃ | H | 241.0–243.0. |

ᵃ Used to prepare acid (R'=H).
ᵇ 7-oxide.
ᶜ Uncorrected M.P.

EXAMPLE 15

The following reaction of ethyl 4-hydroxy-8-methyl-1,7-naphthyridine-3-carboxylate with methyl iodide in the presence of anhydrous potassium carbonate yielded both ethyl 1,4-dihydro-1,8-dimethyl-4-oxo-1,7-naphthyridine-3-carboxylate (15A) and 3-carbethoxy-7,8-dimethyl-4-hydroxy-1,7-naphthyridinium iodide (15B).

(A) A mixture containing 28.0 of ethyl 4-hydroxy-8-methyl-1,7-naphthyridine-3-carboxylate, 25 g. of anhydrous potassium carbonate and 300 cc. of dimethylformamide was heated with stirring on a steam bath until most of the solids had dissolved. The mixture was then cooled slightly; 12 cc. of methyl iodide was added; and the reaction mixture was heated on the steam bath with stirring for two hours. The reaction mixture was filtered, the filtrate diluted with an equal volume of water, and a small amount of concentrated hydrochloric acid was added to decrease basicity. When no precipitate resulted, the resulting solution was evaporated to dryness. The residue was treated with about 500 cc. of water and the remaining green solid was collected and dried (10.0 g., M.P. 228° C. with decomposition; workup below, 15B). The filtrate was extracted seven times with 200 cc. portions of chloroform. The combined extracts were washed twice with water and dried over anhydrous sodium sulfate. The chloroform was evaporated off on a steam bath at atmospheric pressure. To the residue was added a small quantity of water and the mixture evaporated on a steam bath at atmospheric pressure. There was obtained 3.6 g. of solid which was recrystallized twice from absolute ethanol, the first time using decolorizing charcoal, and dried in a vacuum oven to yield 1.65 g. of ethyl 1,4-dihydro-1,8-dimethyl-4-oxo-1,7-naphthyridine-3-carboxylate, M.P. 178.5–180.5° C.

*Analysis.*—Calcd. for $C_{13}H_{14}N_2O_3$ (percent): C, 63.40; H, 5.73; N, 11.38. Found (percent): C, 63.02; H, 5.98; N, 11.27.

(B) A 5 g. portion of the above green solid was recrystallized from water using decolorizing charcoal and the resulting pale greenish-yellow solid was dried in a vacuum oven to yield 3.6 g. of 3-carbethoxy-7,8-dimethyl-4-hydroxy-1,7-naphthyridinium iodide, M.P. 221.0–226.0° C. (corr.) with decomposition.

*Analysis.*—Calcd. for $C_{13}H_{15}IN_2O_3$ (percent): C, 41.73; H, 4.04; I, 33.92; N, 7.49. Found (percent): C, 41.80; H, 4.23; I, 34.00; N, 6.91, 6.95.

EXAMPLE 16

The reaction of 3-carbethoxy-6,8-dimethyl-4-hydroxy-1,7-naphthyridine-7-oxide with acetic anhydride in acetic acid yielded two products, namely, ethyl 8-acetoxymethyl-4-hydroxy-6-methyl - 1,7 - naphthyridine - 3 - carboxylate (16A) and ethyl 4,5-dihydroxy-6,8-dimethyl - 1,7 - naphthyridine-3-carboxylate (16B).

(A) A mixture containing 121 g. of 3-carbethoxy-4-hydroxy-6,8-dimethyl-4-hydroxy - 1,7 - naphthyridine-7-oxide, 70 g. of acetic anhydride and 300 cc. of acetic acid was stirred on a steam bath for eight hours. The reaction mixture was allowed to cool to room temperature; the resulting solid was collected, washed with ethyl acetate, and dried to yield 26.5 g. of solid, M.P. 275–295° C. with decomposition (see Example 16B below). The filtrate obtained after removal of the above compound from the reaction mixture was combined with the ethyl acetate washings and the ethyl acetate was removed by heating in vacuo. The residual material was triturated with 500 cc. of hot ethyl acetate, the hot mixture filtered, and the collected solid dried and recrystallized from dimethylformamide to yield 49 g. of ethyl 8-acetoxymethyl-4-hydroxy-6-methyl-1,7-naphthyridine - 3 - carboxylate, M.P. 225–227° C. A second crop was obtained from the ethyl acetate washings by distilling off the ethyl acetate, triturating the residue with 100 cc. of ethyl acetate, and recrystallizing this material from 500 cc. of ethanol using decolorizing charcoal to yield 11.1 g. of ethyl 8-acetoxymethyl-4-hydroxy-6-methyl-1,7-naphthyridine-3 - carboxylate, M.P. 225.4–227.0° C. (corr.).

*Analysis.*—Calcd. for $C_{15}H_{16}N_2O_5$ (percent): C, 59.20; H, 5.30; N, 9.21. Found (percent): C, 59.41; H, 5.49; N, 9.29.

(B) 4,5-dihydroxy-6,8-dimethyl - 1,7 - naphthyridine-3-carboxylic acid.—The 26.5 g. of solid obtained in Example 16A above was triturated with 400 cc. of warm chloroform, the mixture filtered, and the solid recrystallized from 175 cc. of dimethylformamide to yield 13.0 g. of ethyl 4,5-dihydroxy-6,8-dimethyl-1,7-naphthyridine-3-carboxylate, M.P. 310–313° C. with decomposition. This ester was converted into its corresponding acid as follows: A portion of the ester was boiled a few minutes with 10% aqueous potassium hydroxide solution and the solution acidified with hydrochloric acid to a pH of 4.0. The precipitate was collected, washed with water, and recrystallized from dimethylformamide. The resulting acid, 4,5-dihydroxy-6,8-dimethyl-1,7-naphthyridine-3-carboxylic acid, melted at 295° C. with decomposition.

*Analysis.*—Calcd. for $C_{11}H_{10}N_2O_4$ (percent): C, 56.41; H, 4.30; N, 11.96. Found (percent): C, 56.51; H, 4.42; N, 12.00.

In another run of this hydrolysis, 23.6 g. of ethyl 4,5-dihydro-6,8-dimethyl-1,7-naphthyridine-3-carboxylate and 150 cc. of 10% aqueous potassium hydroxide solution was heated on a steam bath for two hours, the reaction mixture made slightly acidic with hydrochloric acid, the solid collected and recrystallized from dimethylformamide to yield 14.1 g. of 4,5-dihydroxy-6,8-dimethyl-1,7-naphthyridine-3-carboxylic acid, M.P. 285.0–286.0° C. (corr.) with decomposition.

*Analysis.*—Calcd. for $C_{11}H_{10}N_2O_4$ (percent): C, 56.41; H, 4.30; N, 11.96. Found (percent): C, 56.67; H, 4.55; N, 12.21.

EXAMPLE 17

(A) 3-carboxy-4-hydroxy-6,7,8-trimethyl - 1,7 - naphthyridinium hydroxide inner salt.—A mixture containing 45 g. of 3-carbethoxy-4-hydroxy-6,7,8-trimethyl-1,7-naphthyridinium iodide and 250 cc. of 10% aqueous potassium hydroxide solution was heated on a steam bath for thirty minutes, decolorizing charcoal added, and the hot mixture filtered. To the filtrate was added acetic acid until no further precipitation resulted; the mixture was cooled; and the precipitate was collected, recrystallized twice from water (using decolorizing charcoal the second time), and dried in a vacuum oven at 70° C. to yield 10 g. of 3-carboxy-4-hydroxy-6,7,8-trimethyl - 1,7 - naphthyridinium hydroxide inner salt, M.P. 320–321° C. with decomposition. On the basis of infrared spectral data and the following analysis, this product probably has the structure of Formula II where Z is COOH, $R_5$ is H, and $R_6$, $R_7$ and $R_8$ are each $CH_3$.

*Analysis.*—Calcd. for $C_{12}H_{12}N_2O_3$ (percent): C, 62.06; H, 5.21; N, 12.06. Found (percent): C, 61.93; H, 5.21; N, 11.88.

(B) The above intermediate 3-carbethoxy-4-hydroxy-6,7,8-trimethyl-1,7-naphthyridinium iodide was prepared as follows: A mixture containing 49.2 g. of ethyl 6,8-dimethyl-4-hydroxy-1,7-naphthyridine - 3 - carboxylate, 50 cc. of methyl iodide and 500 cc. of dimethylformamide was heated on a steam bath with stirring for five hours. The reaction mixture was cooled and the precipitate collected to yield 11 g. of the methiodide. The filtrate was treated with two volumes of ether and the resulting precipitate collected to yield another 34 g. of 3-carbethoxy-4-hydroxy-6,7,8-trimethyl-1,7-naphthyridinium iodide.

(C) Following the procedure of Example 17B using a corresponding molar equivalent quantity of ethyl iodide, n-butyl bromide or allyl chloride in place of methyl iodide, there is obtained, respectively, 3-carbethoxy-6,8-dimethyl-7-ethyl-4-hydroxy-1,7-naphthyridinium iodide, 7-n-butyl-3-carbethoxy-6,8-dimethyl-4 - hydroxy - 1,7 - naphthyridinium bromide and 7-allyl-3-carbethoxy-6,8-dimethyl-4-hydroxy-1,7-naphthyridinium chloride.

(D) Following the procedure of Example 17B using corresponding molar equivalent quantities of ethyl 4-hydroxy-6-methyl-1,7-naphthyridine-3-carboxylate in place of ethyl 6,8-dimethyl-4-hydroxy-1,7-naphthyridine-3-carboxylate and benzyl bromide, 4-chlorobenzyl chloride or 4-methoxybenzyl chloride in place of methyl iodide, there is obtained, respectively, 7-benzyl-3-carbethoxy-4-hydroxy-6-methyl-1,7-naphthyridinium bromide, 3-carbethoxy-7-(4-chlorobenzyl) - 4 - hydroxy-6-methyl-1,7-naphthyridinium chloride or 3-carbethoxy-4-hydroxy-7-(4-methoxybenzyl)-6-methyl-1,7-naphthyridinium chloride.

EXAMPLE 18

3-carboxy-7,8-dimethyl - 4 - hydroxy-1,7-naphthyridinium hydroxide inner salt.—A mixture containing 33.5 g. of 3-carbethoxy-7,8-dimethyl - 4 - hydroxy-1,7-naphthyridinium iodide and 70 cc. of 6 N aqueous hydrochloric acid solution was heated with stirring on a steam bath for ninety minutes. Decolorizing charcoal and a little more water were added, and the mixture heated an additional fifteen minutes and filtered. The filtrate was placed in an ice bath and the solid that separated was collected. The solid was taken up in about 250 cc. of boiling water, the hot solution filtered to remove a small amount of insoluble material, and the filtrate allowed to cool. The crystalline precipitate that separated was collected to yield 19.5 g. (63%) of 3-carboxy-7,8-dimethyl-4-hydroxy-1,7-naphthyridinium iodide, M.P. 262° C. with decomposition. This product was dispersed in hot water, neutralized with 10% aqueous potassium bicarbonate solution, the hot solution treated with decolorizing charcoal and filtered, and the filtrate cooled in an ice bath. The resulting crystalline precipitate was collected, recrystallized once from about 175 cc. of water containing a little potassium bicarbonate, and recrystallized a second time from water and dried in a vacuum oven to yield 3.5 g. of 3-carboxy-7,8-dimethyl-4-hydroxy - 1,7 - naphthyridinium hydroxide inner salt, a greenish-yellow powder, M.P. 308° C. with decomposition. On the basis of infrared spectral data and the following analysis, this product probably has the structure of Formula II where Z is COOH, $R_5$ and $R_6$ are each H, and $R_7$ and $R_8$ are each $CH_3$.

*Analysis.*—Calcd. for $C_{11}H_{10}N_2O_3$ (percent): C, 60.54; H, 4.62; N, 12.84. Found (percent): C, 60.61; H, 4.81; N, 13.01.

EXAMPLE 19

3-carboxy - 1,4 - dihydro-4-oxo-1,6,7,8-tetramethyl-1,7-naphthyridinium hydroxide inner salt.—To a suspension of 20 g. of 3-carboxy-4-oxo-1,6,7,8-tetramethyl-1,7-naphthyridinium iodide in 25 cc. of cold water was added 4.5 cc. of 28% aqueous ammonia and the solution was filtered. About 300 cc. of acetone was added to the filtrate and the oily material that separated was triturated to induce solidification of the oil. The resulting yellow solid was collected, recrystallized once from water-acetone and twice from water, and dried for seventy hours at 78° C. in a vacuum oven to yield 7.2 g. of 3-carboxy-1,4-dihydro-4-oxo - 1,6,7,8 - tetramethyl - 1,7-naphthyridinium hydroxide inner salt, an orange solid, M.P. 210.0–211.0° C. (corr.) with decomposition. On the basis of infrared spectral data and the following analysis, this product probably has the structure of Formula III where $R_5$ is H, and $R_1$, $R_6$, $R_7$ and $R_8$ are each $CH_3$.

*Analysis.*—Calcd. for $C_{13}H_{14}N_2O_3$ (percent): C, 63.40; H, 5.73; N, 11.38. Found (percent): C, 62.68; H, 5.53; N, 10.91; $H_2O$, 0.9. Found (dry basis) (percent): C, 63.25; H, 5.48; N, 11.01.

EXAMPLE 20

3 - carboxy - 4,5 - dihydroxy-6,7,8-trimethyl-1,7-naphthyridinum hydroxide inner salt.—To a stirred solution of 12.1 g. of ethyl 4,5-dihydroxy-6,8-dimethyl-1,7-naphthyridine-3-carboxylate in 350 cc. of dimethylformamide heated on a steam bath was added 20.7 g. of anhydrous potassium carbonate and 9.3 cc. of methyl iodide. This reaction mixture was heated on a steam bath for four hours, the remaining solid filtered off and discarded, and the filtrate concentrated to dryness. The residue was triturated with water, dried, and recrystallized from ethanol to yield 4.5 g. of a light yellow solid (3-carbethoxy-4,5-dihydroxy-6,7,8-trimethyl - 1,7 - naphthyridinium iodide), M.P. 217–220° C. with decomposition. The solid was heated on a steam bath for one hour with 36 cc. of 5% aqueous potassium hydroxide solution; the resulting solution was neutralized with aqueous hydrochloric acid; and the solid that precipitated was collected, dried, and recrystallized from dimethylformamide to yield 1.4 g. of 3 - carboxy - 4,5 - dihydroxy - 6,7,8 - trimethyl-1,7-naphthyridinium hydroxide inner salt, a yellow solid, M.P. 330° C. with decomposition. On the basis of infrared spectra data and the following analysis, this compound probably has the structure of Formula II where Z is COOH, $R_5$ is OH, and $R_6$, $R_7$ and $R_8$ are each $CH_3$.

*Analysis.*—Calcd. for $C_{12}H_{12}N_2O_4$ (percent): C, 58.06; H, 4.87; N, 11.29. Found (percent): C, 58.35; H, 4.73; N, 11.21.

EXAMPLE 21

The following reaction of 3-cyano-6,8-dimethyl-4-hydroxy-1,7-naphthyridine with methyl iodide yielded a mixture of 3-cyano-4-hydroxy-6,7,8-trimethyl-1,7-naphthyridinium hydroxide inner salt (21A) and 3-cyano-1,4-dihydro-4-oxo-1,6,8-trimethyl-1,7-naphthyridine (21B).

(A) To a stirred solution of 32.8 g. of 3-cyano-6,8-dimethyl-4-hydroxy-1,7-naphthyridine in 250 cc. of dimethylformamide heated on a steam bath was added 23 g. of anhydrous potassium carbonate and then 12.4 cc. of methyl iodide, and the resulting reaction mixture was heated on a steam bath with stirring for two hours. The hot reaction mixture was filtered and the filtrate chilled to yield a green solid. [The solid was collected, recrystallized from 100 cc. of water, and set aside (see 21B)]. The aqueous mother liquors from the reaction mixture were concentrated and the residue fractionally crystallized from dimethylformamide and from acetonitrile to yield 3.6 g. (10.3%) of 3-cyano-4-hydroxy-6,7,8- trimethyl-1,7-naphthyridinium hydroxide inner salt, a dark green solid, M.P. →300° C. with decomposition. On the basis of infrared spectral data and the following analysis, this compound probably has the structure of Formula II where Z is CN, $R_5$ is H, and $R_6$, $R_7$ and $R_8$ are each $CH_3$.

*Analysis.*—Calcd. for $C_{12}H_{11}N_3O$ (percent): C, 67.59; H, 5.20; N, 19.71. Found (percent): C, 67.47; H, 5.04; N, 19.59.

(B) The solid set aside in Example 21A was dissolved in water and the water solution washed repeatedly with chloroform. The chloroform washings were combined and concentrated by heating in vacuo on a steam bath. The concentrated chloroform solution was washed twice with water and further evaporated until a solid began to separate. The mixture was again transferred to a separatory funnel and again washed with water. Considerable further solid separated during this procedure. The solid was collected and recrystallized from dimethylformamide to yield 3.6 g. (10.3%) of 3-cyano-1,4-dihydro-4-oxo-1,6,8-trimethyl-1,7 - naphthyridine, a white solid, M.P. 290.8–292.2° C. (corr.). Infrared spectral analysis showed this compound to have a strong carbonyl peak as well as a cyano peak.

*Analysis.*—Calcd. for $C_{12}H_{11}N_3O$ (percent): C, 67.59; H, 5.20; N, 19.71. Found (percent): C, 67.58; H, 5.52; N, 19.67.

(C) The above intermediate 3-cyano-6,8-dimethyl-4-hydroxy-1,7-naphthyridine was prepared in two steps as follows: A mixture containing 122 g. of 3-amino-2,6-dimethylpyridine, 180 g. of ethyl ethoxymethylenecyanoacetate and 300 cc. of dimethylformamide was heated on a steam bath for about thirty minutes and then on a hot plate to dissolve completely the reactants and some product which had separated. The hot solution was allowed to cool to room temperature and the precipitated product was collected, washed and triturated with ethanol, and dried to yield 226 g. (92%) of ethyl N-(2,6-dimethyl-3-pyridyl)aminomethylenecyanoacetate, M.P. 198–199° C. A mixture of 61 g. of ethyl N-(2,6-dimethyl-3-pyridiyl) aminomethylenecyanoacetate and 2500 cc. of diethyl phthalate was heated for three minutes at 287–290° C. and then for twelve minutes at 290° C. The hot reaction mixture was allowed to cool to room temperature with stirring and then divided into two portions. Each portion was diluted with three liters of n-hexane with stirring. The solids that separated from each were collected, combined, triturated with n-hexane, dried, and recrystallized successively from dimethylformamide, ethanol and dimethylformamide to yield 5.5 g. of 3-cyano-6,8-dimethyl-4-hydroxy-1,7-naphthyridine, M.P. 298–300° C. with decomposition.

*Analysis.*—Calcd. for $C_{11}H_9N_3O$ (percent): C, 66.32; H, 4.55; N, 21.10. Found (percent): C, 66.07; H, 4.51; N, 21.13.

EXAMPLE 22

(A) 1,4 - dihydro - 1,6 - dimethyl-8-hydroxy-4-oxo-quinoline-3-carboxylic acid from 3-carbethoxy-1,4-dihydro-4-oxo-1,6,7,8-tetramethyl-1,7-naphthyridinium iodide. A mixture containing 0.7 g. of 3-carbethoxy-1,4-dihydro-4-oxo-1,6,7,8-tetramethyl - 1,7 - naphthyridinium iodide monohydrate, 2.0 cc. of 10% aqueous potassium hydroxide solution and 10 cc. of water was heated on a steam bath for about fifteen minutes whereupon solid started to separate. The reaction mixture was diluted to a volume of 25 cc. with water and heating was continued for an additional ninety minutes, at which time an additional 2.0 cc. of 10% potassium hydroxide solution was added to dissolve the precipitated solid. The solution was then heated an additional hour on a steam bath, filtered and to the filtrate was added hydrochloric acid to a pH of 3.5. The solid that separated was collected and recrystallized from about 10 cc. of dimethylformamide to yield 300 mg. of sparkling tan needles, M.P. 340° C. with decomposition after triturating successively with ethanol and ether. The compound also gave a negative test for halogen. The compound was dissolved in aqueous potassium hydroxide solution, filtered, and the filtrate was heated to its boiling point and acidified with acetic acid to a pH of 7. The solid was separated, washed successively with water and acetone and dried to yield the white solid product, 1,4-dihydro-1,6-dimethyl-8-hydroxy-4-oxoquinoline-3-carboxylic acid, M.P. 340–345° C. with decomposition, the structure of which was confirmed by its NMR and infrared spectral analyses, and the following analysis.

*Analysis.*—Calcd. for $C_{12}H_{11}NO_4$ (percent): C, 61.80; H, 4.75; N, 6.01. Found (percent): C, 61.80; H, 4.83; N, 5.81.

(B) The intermediate 3-carbethoxy-1,4-dihydro-4-oxo-1,6,7,8-tetramethyl-1,7-naphthyridinium iodide was prepared as follows: A solution containing 5.6 g. of ethyl 1,4-dihydro - 4 - oxo-1,6,8-trimethyl-1,7-naphthyridine-3-carboxylate, 75 cc. of dimethylformamide and 6 cc. of methyl iodide was heated on a steam bath for sixteen hours, allowed to cool to room temperature, and filtered. The filtrate was concentrated and the residual liquid taken up in 100 cc. of ethanol. When cooling yielded a tarry material, the mixture was heated on a steam bath in vacuo to remove the ethanol. Water was added to the residual material and the mixture chilled. The tarry material that separated was filtered off by filtering the mixture through infusorial earth (Super-cel). The aqueous filtrate was concentrated to about 75 cc. and chilled; the light orange solid that separated was collected, recrystallized from ethanol and dried in a vacuum oven at 50° C. to yield 1.8 g. of 3-carbethoxy-1,4-dihydro-4-oxo-1,6,7,8-tetramethyl-1,7-naphthyridinium iodide as its monohydrate.

*Analysis.*—Calcd. for $C_{15}H_{19}IN_2O_3$ (percent): N, 6.96; I, 31.55. Found (percent): $H_2O$, 4.48; N, 6.43; I, 30.00. Found (Dry Basis) (percent): N, 6.73; I, 31.41.

(C) Following the procedure in Example 18 for the hydrolysis of 3 - carbethoxy - 7,8-dimethyl-4-hydroxy-1,7-naphthyridinium iodide with hydrochloric acid to the corresponding 3-carboxy compound, 3-carboxy-1,4-dihydro - 4 - oxo - 1,6,7,8-tetramethyl-1,7-naphthyridinium iodide is obtained using corresponding molar equivalent quantities of 3-carbethoxy-1,4-dihydro-4-oxo-1,6,7,8-tetramethyl-1,7-naphthyridinium iodide monohydrate and hydrochloric acid.

(D) Following the procedure described in Example 22A using a molar equivalent quantity of 7-allyl-3-carbethoxy - 1,4 - dihydro - 4-oxo-1,6,8-trimethyl-1,7-naphthyridinium bromide in place of 3-carbethoxy-1,4-dihydro-4 - oxo - 1,6,7,8-tetramethyl-1,7-naphthyridinium iodide, there is obtained the same product, 1,4-dihydro-1,6-dimethyl-8-hydroxy-4-oxoquinoline-3-carboxylic acid. The intermediate 7 - allyl-3-carbethoxy-1,4-dihydro-oxo-1,6,8-trimethyl-1,7-naphthyridinium bromide is obtained following the procedure described in Example 22B using a molar equivalent quantity of allyl bromide in place of methyl iodide.

EXAMPLE 23

1,4 - dihydro - 1,6-dimethyl-8-hydroxy-4-oxo-quinoline-3 - carboxylic acid from 3 - carboxy - 1,4 - dihydro-4-oxo-1,6,7,8 - tetramethyl - 1,7 - naphthyridinium iodide. To a solution containing 12.7 g. of 3-carboxy-1,4-dihydro-4-oxo-1,6,7,8-tetramethyl-1,7-naphthyridinium iodide in 400 cc. of water was added 50 cc. of 10% aqueous potassium hydroxide solution. The resulting solution was heated on a steam bath for forty minutes and acidified with hydrochloric acid to a pH of 4. The resulting white precipitate was collected, washed successively with water and acetone, and dried to yield 7.2 g. of 1,4-dihydro-1,6-dimethyl-8-hydroxy-4-oxoquinoline-3-carboxylic acid, M.P. 340° C. with decomposition.

EXAMPLE 24

4,8 - dihydroxy - 6 - methylquinoline-3-carboxylic acid from 3 - carboxy - 4 - hydroxy-6,7,8-trimethyl-1,7-naphthyridinium hydroxide inner salt.—A solution containing 1.0 g. of 3 - carboxy - 4-hydroxy-6,7,8-trimethyl-1,7-naphthyridinium hydroxide inner salt and 6.5 cc. of 10% aqueous potassium hydroxide solution was heated on a steam bath under a reflux condenser for sixteen hours. The reaction mixture was diluted to a volume of about 80 cc. with water and the resulting solution acidified with 1 cc. of acetic acid. The solid that separated was collected, washed successively with water and acetone, and dried to yield 390 mg. of 4,8-dihydroxy-6-methylquinoline-3-carboxylic acid, M.P. 295° C. with decomposition.

*Analysis.*—Calcd. for $C_{11}H_9NO_4$ (percent): C, 60.27; H, 4.14; N, 6.39. Found (percent): C, 59.99; H, 4.30; N, 7.09.

EXAMPLE 25

(A) 4,8-dihydroxy-6,7-dimethylquinoline-3-carboxylic acid from 3-carboxy-6,7-dimethyl-8-ethyl-4-hydroxy-1,7-naphthyridinium hydroxide inner salt.—A solution containing 1.0 g. of 3 - carboxy - 6,7 - dimethyl-8-ethyl-4-hydroxy-1,7-naphthyridinium hydroxide inner salt and 6.0 cc. of 10% aqueous potassium hydroxide solution was heated on a steam bath for two and one-half hours. The reaction mixture was diluted to a volume of about 40 cc. with water; 1 cc. of acetic acid was added to the hot solution; and, the solid that separated was collected and triturated twice with 100 cc. portions of hot water to remove any unreacted starting material. The solid was then recrystallized by dissolving it in hot dimethylformamide and adding water to the boiling dimethylformamide solution to precipitate the product which was collected, washed successively with water and acetone, and dried in a vacuum oven at 60° C. to yield 4,8-dihydroxy-6,7-dimethylquinoline-3-carboxylic acid, M.P. 290° C. with decomposition. Nuclear magnetic resonance spectral analysis of this compound showed two sharp methyl signals.

*Analysis.*—Calcd. for $C_{12}H_{11}NO_4$ (percent): C, 61.80; H, 4.75; N, 6.01. Found (percent): C, 61.37; H, 4.84; N, 5.78.

(B) The above intermediate 3-carboxy-6,7-dimethyl-8-ethyl-4-hydroxy-1,7-naphthyridinium hydroxide inner salt was prepared by methylating the corresponding 3-carboxy-4-hydroxy - 6,7,8 - trimethyl-1,7-naphthyridinium hydroxide inner salt, as follows: A mixture containing 7.0 g. of 3-carboxy-4-hydroxy-6,7,8-trimethyl-1,7-naphthyridinium hydroxide inner salt, 4.2 g. of anhydrous potassium carbonate and 80 cc. of dimethylformamide was heated with stirring on a steam bath for ten minutes. To this mixture was added 5 cc. of methyl iodide and the resulting reaction mixture was stirred on the steam bath for two hours and then filtered. The filtrate was chilled and the solid that separated was collected and washed with acetone. In case some methyl ester had been formed, the solid was dissolved in 125 cc. of hot water, 30 cc. of 10% aqueous potassium hydroxide solution was added, and the resulting mixture heated on a steam bath for three minutes (this amouunt of time is sufficient to hydrolyze any 3-carbomethoxy compound to the corresponding 3-carboxy compound without affecting any appreciable ring opening to form the 8-hydroxy-quinoline shown above). The alkaline solution was acidified with acetic acid and chilled. The resulting precipitate was collected, washed with acetone, dried, recrystallized four times from dimethylformamide, triturated successively with water and ethanol at room temperature, and dried in vacuo at 65° C. to yield 3-carboxy-6,7-dimethyl-8-ethyl-4-hydroxy - 1,7-naphthyridinium hydroxide inner salt, M.P. 309° C. with decomposition.

*Analysis.*—Calcd. for $C_{13}H_{14}N_2O_3$ (percent): C, 63.40; H, 5.73; N, 11.38. Found (percent): C, 63.08; H, 5.60; N, 11.38.

(C) Following the procedure described in Example 25A using the appropriate 8-substituted-1,7-naphthydridinium salt, the following compounds are obtained: 4,8-dihydroxy-7-ethyl-6-methylquinoline-3-carboxylic acid using 3-carboxy-6,7-dimethyl-4-hydroxy-8-n-propyl - 1,7 - naphthyridinium hydroxide inner salt (prepared as in Example 25B using ethyl iodide in place of methyl iodide), and 7-benzyl-8-hydroxyquinoline using 7-methyl-8-(2-phenylethyl)-1,7-naphthyridinium chloride (prepared as in Example 25B using 7,8-dimethyl-1,7-naphthyridinium chloride and benzyl chloride).

EXAMPLE 26

(A) 4-hydroxy-6,7,8-trimethyl - 1,7 - naphthyridinium hydroxide inner salt is obtained following the procedure described in Example 17A using corresponding molar equivalent quantities of 4-hydroxy-6,7,8-trimethyl-1,7-naphthyridinium iodide and aqueous potassium hydroxide solution. The intermediate 4-hydroxy-6,7,8-trimethyl-1,7-naphthyridinium iodide is obtained following the procedure described in Example 17B using corresponding molar equivalent quantities of 6,8-dimethyl-4-hydroxy-1,7-naphthyridine and methyl iodide. 6,8-dimethyl-4-hydroxy-1,7-naphthyridine is obtained by decarboxylating 6,8-dimethyl-4-hydroxy-1,7 - naphthyridine - 3-carboxylic acid by heating the acid in an oil bath at about 300° C. for about ten minutes.

(B) Following the procedure described in Example 24 using corresponding molar equivalent quantities of 4-hydroxy-6,7,8-trimethyl-1,7 - naphthyridinium hydroxide inner salt and aqueous potassium hydroxide solution, 4,8-dihydroxy-6-methylquinoline is obtained.

(C) Following the procedure described in Example 23 using corresponding molar equivalent quantities of 4-hydroxy-6,7,8-trimethyl-1,7-naphthyridinium iodide and aqueous potassium hydroxide solution, 4,8-dihydroxy-6-methylquinoline is obtained.

EXAMPLE 27

(A) 1,4-dihydro-4-oxo-1,6,7,8-tetramethyl - 1,7-naphthyridinium hydroxide inner salt is obtained following the procedure described in Example 19 using corresponding molar equivalent quantities of 1,4-dihydro-4-oxo-1,6,7,8-tetramethyl-1,7-naphthyridinium iodide and aqueous ammonia. The intermediate 1,4-dihydro-4-oxo-1,6,7,8-tetramethyl-1,7-naphthyridinium iodide is obtained following the procedure described in Example 17B using corresponding molar equivalent quantities of 1,4-dihydro-4-oxo-1,6,8-trimethyl - 1,7-naphthyridine and methyl iodide. 1,4-dihydro-4-oxo-1,6,8 - trimethyl-1,7-naphthyridine was obtained as follows: 9.3 g. of 1,4-dihydro-4-oxo-1,6,8-trimethyl-1,7-naphthyridine - 3-carboxylic acid was heated in an oil bath at 285–310° C. for ten minutes. The reaction mixture was cooled and taken up in about 40 cc. of chloroform. The chloroform solution was treated with decolorizing charcoal (no apparent effect) and filtered. The filtrate was evaporated to about two-thirds of its original volume, and ether added to the hot solution until crystallization started. The mixture was cooled; the precipitate was collected and recrystallized successively from acetone and acetonitrile to yield 3.3 g. of 1,4-dihydro-4-oxo-1,6,8-trimethyl - 1,7-naphthyridine, M.P. 168.0–170.8° C. (corr.).

*Analysis.*—Calcd. for $C_{11}H_{12}N_2O$ (percent): C, 70.20; H, 6.43; N. 14.89. Found (percent): C, 70.32; H, 6.52; N, 14.67.

(B) Following the procedure described in Example 25A using corresponding molar equivalent quantities of 1,4-dihydro-4-oxo-1,6,7,8 - tetramethyl - 1,7-naphthyridinium hydroxide inner salt and aqueous potassium hydroxide solution 1,4-dihydro-1,6-dimethyl-8-hydroxy-4-oxoquinoline is obtained.

(C) Following the procedure described in Example 23 using corresponding molar equivalent quantities of 1,4-dihydro-4-oxo-1,6,7,8-tetramethyl - 1,7 - naphthyridinium iodide and aqueous potassium hydroxide solution, 1,4-dihydro-1,6-dimethyl - 8 - hydroxy-4-oxoquinoline is obtained.

The subject matter which the applicant regards as his invention is particularly pointed out and distinctly claimed as follows:

1. A process for preparing an 8-hydroxyquinoline which comprises heating an [8-(lower-alkyl)-7-$R_7$-1,7-naphthyridinium] 8 - (lower-alkyl)-7-$R_7$-3-unsubstituted-1,7-naphthyridinium salt in an aqueous alkaline medium, where $R_7$ is lower-alkyl or lower-alkenyl and the carbon atom of lower-alkyl attached to the 8-carbon atom of the 1,7-naphthyridine ring contains at least two hydrogen atoms, said 8-hydroxyquinoline being unsubstituted in the 7-position or containing as the 7-substituent lower-alkyl having one less carbon atom than the 8-(lower-alkyl) substituent of the starting 1-naphthyridinium salt.

2. A process according to claim 1 where $R_7$ is lower-alkyl.

3. A process according to claim 2 for preparing a 4,8-dihydroxyquinoline which comprises heating a 4-hydroxy-7,8-di-(lower-alkyl)-1,7-naphthyridinium salt in an aqueous alkaline medium.

4. A process according to claim 2 for preparing a 4,8-dihydroxyquinoline which comprises heating 4-hydroxy-7,8-di-(lower-alkyl)-1,7-naphthyridinium hydroxide inner salt in an aqueous alkaline medium.

5. A process according to claim 1 where the aqueous alkaline medium is aqueous alkali hydroxide.

6. A process according to claim 4 where the aqueous alkaline medium is aqueous alkali hydroxide.

References Cited

UNITED STATES PATENTS

| 3,149,104 | 9/1964 | Lesher et al. | 260—240 |
| 3,172,811 | 3/1965 | Kaminsky | 260—287 X |
| 3,178,348 | 4/1965 | Bickerton | 260—289 X |
| 3,267,106 | 8/1966 | Watson | 260—287 |
| 3,290,315 | 12/1966 | Watson | 260—287 |
| 3,324,135 | 6/1967 | Lesher | 260—287 |
| 3,377,352 | 4/1968 | Clark et al. | 260—287 |

DONALD G. DAUS, Primary Examiner

U.S. Cl. X.R.

260—287, 294.9, 294.8, 295, 465.4

PO-1050
(5/69)

UNITED STATES PATENT OFFICE
CERTIFICATE OF CORRECTION

Patent No. 3,506,668          Dated     April 14, 1970

Inventor(s)   George Y. Lesher

It is certified that error appears in the above-identified patent and that said Letters Patent are hereby corrected as shown below:

Column 4, line 13, "R" should read --$R_6$--; line 22, "e.g." should read --e.g.,--. Column 7, line 65, "methyl" should read -- methyl- --. Column 8, line 39, "dilhydro" should read --dihydro--; line 67, "ether" should read --there--. Column 10, line 34, "-17-oxide" should read -- -7-oxide --. Column 12, line 38, "28.0" should read -- 28.0 g. --. Column 15, line 46, "spectra" should read --spectral--; line 74, "→300°C." should read -- >300°C. --. Column 16, line 36, "-pyridiyl)" should read -- -pyridyl) --. Column 17, line 24, "-cel)" should read -- -Cel) --; line 49, "-oxo-" should read -- -4-oxo- --. Column 18, line 55, "amouunt" should read --amount--; line 71, "-naphthydridinium" should read -- -naphthyridinium --. Column 20, line 7, "solution" should read --solution,--; lines 19-20, delete "[8-(lower-alkyl)-7-$R_7$-1,7-naphthyridinium]".

SIGNED AND
SEALED
AUG 25 1970

(SEAL)
Attest:

Edward M. Fletcher, Jr.
Attesting Officer

WILLIAM E. SCHUYLER, JR.
Commissioner of Patents